United States Patent
Nakanishi

(10) Patent No.: US 12,474,879 B2
(45) Date of Patent: Nov. 18, 2025

(54) DISPLAY PROCESSING DEVICE, DISPLAY PROCESSING SYSTEM, AND DISPLAY PROCESSING METHOD

(71) Applicant: Panasonic Intellectual Property Management Co., Ltd., Osaka (JP)

(72) Inventor: Hideo Nakanishi, Kanagawa (JP)

(73) Assignee: PANASONIC AUTOMOTIVE SYSTEMS CO., LTD., Kanagawa (JP)

(*) Notice: Subject to any disclaimer, the term of this patent is extended or adjusted under 35 U.S.C. 154(b) by 0 days.

(21) Appl. No.: 18/425,908

(22) Filed: Jan. 29, 2024

(65) Prior Publication Data
US 2024/0256205 A1 Aug. 1, 2024

(30) Foreign Application Priority Data
Jan. 30, 2023 (JP) ................................ 2023-011859

(51) Int. Cl.
G06F 3/14 (2006.01)
B60K 35/28 (2024.01)
G06F 21/84 (2013.01)

(52) U.S. Cl.
CPC ............ G06F 3/1423 (2013.01); B60K 35/28 (2024.01); G06F 21/84 (2013.01); B60K 2360/182 (2024.01); B60K 2360/186 (2024.01)

(58) Field of Classification Search
CPC ....... G06F 3/1423; G06F 21/84; B60K 35/28; B60K 2360/182; B60K 2360/186
See application file for complete search history.

(56) References Cited

U.S. PATENT DOCUMENTS

| | | | |
|---|---|---|---|
| 10,720,054 B2 | 7/2020 | Kukimoto et al. | |
| 2018/0137263 A1* | 5/2018 | Kurian | G06F 21/32 |
| 2019/0251840 A1* | 8/2019 | Kukimoto | B60K 35/29 |

FOREIGN PATENT DOCUMENTS

JP 2019-139518 8/2019

* cited by examiner

*Primary Examiner* — Robert J Michaud
(74) *Attorney, Agent, or Firm* — Greenblum & Bernstein, P.L.C.

(57) ABSTRACT

A display processing device changes, when notification information on one display screen among multiple display screens provided in a vehicle is changed based on an operation by a driver of the vehicle, notification information to be displayed on another display screen, based on the change of the notification information on the one display screen. When notification information displayed on one display screen among multiple display screens is to be changed to another notification information based on an operation by the driver and when an occupant other than the driver is present in the vehicle and when the another notification information is information associated with the driver, the display processing device restricts the display of the another notification information on the one display screen.

7 Claims, 12 Drawing Sheets

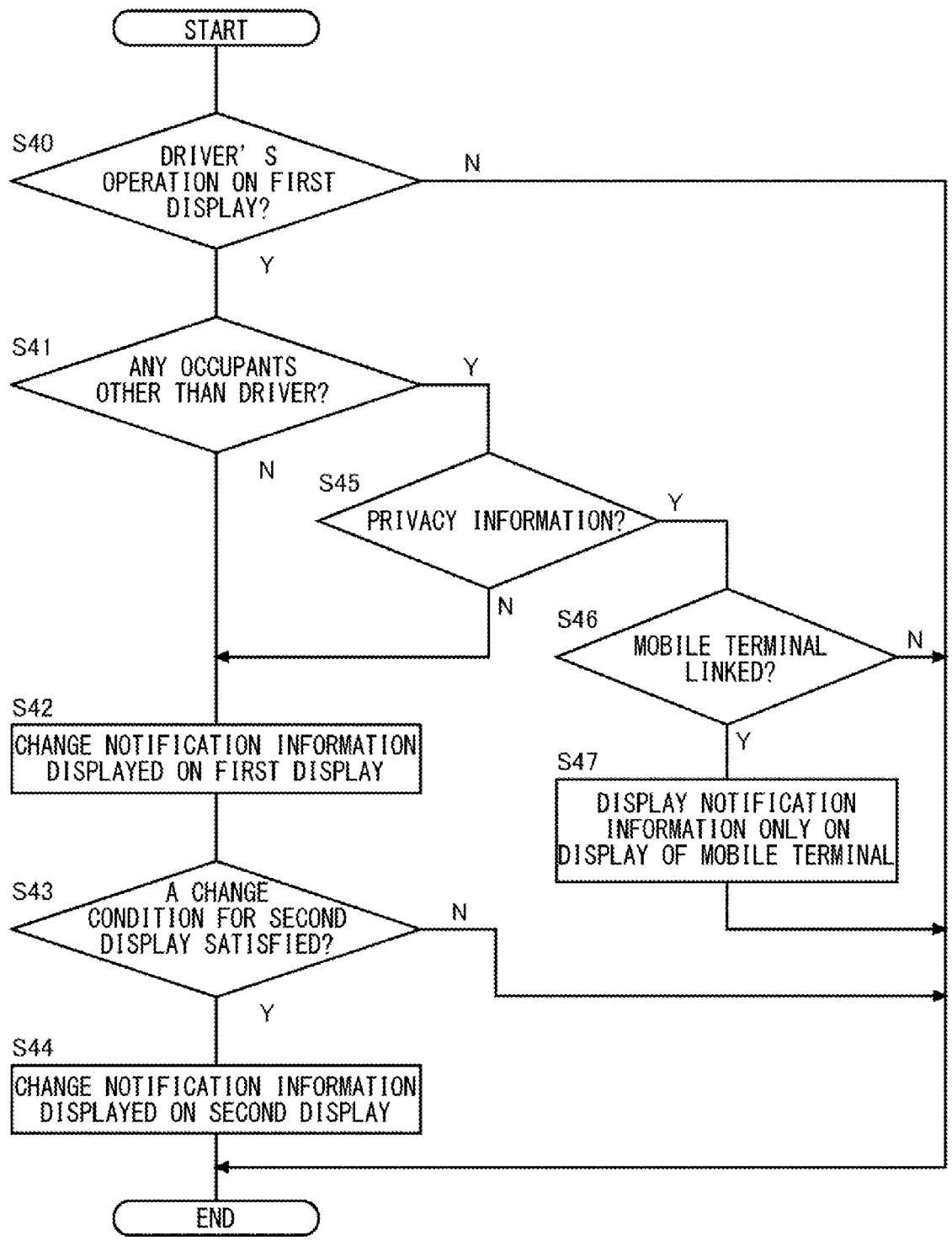

DISPLAY PROCESSING DEVICE, DISPLAY PROCESSING SYSTEM, AND DISPLAY PROCESSING METHOD

BACKGROUND

1. Field

The present disclosure relates to a data processing technology, and particularly to a display processing device, a display processing system, and a display processing method.

2. Description of the Related Art

The following Patent Literature 1 proposes a display processing apparatus that changes notification information to be displayed on one display among multiple displays in a vehicle based on a user's operation and also changes notification information to be displayed on another display in the vehicle based on the change in the notification information to be displayed on the one display.

PRIOR ART REFERENCE

Patent Literature

Patent Literature 1: Japanese Unexamined Patent Application Publication No. 2019-139518

When a passenger is present, the driver may not want the notification information to appear on a display in the vehicle. From this point of view, the inventor considered that there is room for improvement in the technology of Patent Literature 1.

SUMMARY

The present disclosure has been made on the basis of the aforementioned issue recognized by the inventor, and a purpose thereof is to provide a technology for suitably protecting the privacy of the driver in a situation where multiple display screens provided in the vehicle are linked for the display of notification information thereon.

In response to the above issue, a display processing device according to one embodiment of the present invention includes: an acquirer that acquires notification information; a setter that sets, for each of multiple display screens provided in a vehicle, notification information to be displayed on the display screen, based on a priority level related to the notification information; and a changer that changes, when notification information on one display screen among the multiple display screens is changed based on an operation by a driver of the vehicle performed on a display screen set by the setter, notification information to be displayed on another display screen, based on the change of the notification information on the one display screen. When notification information displayed on one display screen among multiple display screens is to be changed to another notification information based on an operation by the driver and when an occupant other than the driver is present in the vehicle and when the another notification information is information associated with the driver, the setter restricts the display of the another notification information on the one display screen.

Another embodiment relates to a display processing system. The display processing system includes: an acquirer that acquires notification information; a setter that sets, for each of multiple display screens provided in a vehicle, notification information to be displayed on the display screen, based on a priority level related to the notification information; and a changer that changes, when notification information on one display screen among the multiple display screens is changed based on an operation by a driver of the vehicle performed on a display screen set by the setter, notification information to be displayed on another display screen, based on the change of the notification information on the one display screen. When notification information displayed on one display screen among multiple display screens is to be changed to another notification information based on an operation by the driver and when an occupant other than the driver is present in the vehicle and when the another notification information is information associated with the driver, the setter restricts the display of the another notification information on the one display screen.

Yet another embodiment relates to a display processing method. In the method, a computer implements: acquiring notification information; setting, for each of multiple display screens provided in a vehicle, notification information to be displayed on the display screen, based on a priority level related to the notification information; changing, when notification information on one display screen among the multiple display screens is changed based on an operation by a driver of the vehicle performed on a set display screen, notification information to be displayed on another display screen, based on the change of the notification information on the one display screen; and restricting, when notification information displayed on one display screen among the multiple display screens is to be changed to another notification information based on an operation by the driver and when an occupant other than the driver is present in the vehicle and when the another notification information is information associated with the driver, the display of the another notification information on the one display screen.

Optional combinations of the aforementioned constituting elements, and implementation of the present disclosure in the form of computer programs and recording media storing computer programs may also be practiced as additional modes of the present disclosure.

BRIEF DESCRIPTION OF THE DRAWINGS

Embodiments will now be described, by way of example only, with reference to the accompanying drawings which are meant to be exemplary, not limiting, and wherein like elements are numbered alike in several figures, in which:

FIG. 9 is a flowchart that shows an operation of a display processing device in a third embodiment;

DETAILED DESCRIPTION OF THE EMBODIMENTS

Figure 1:
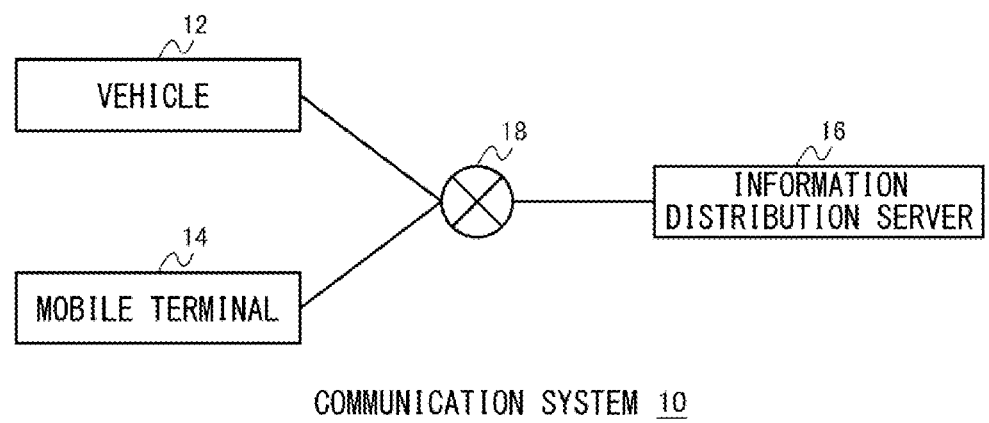
FIG. 1 illustrates a configuration of a communication system according to a first embodiment.

The invention will now be described by reference to the preferred embodiments. This does not intend to limit the scope of the present invention, but to exemplify the invention.

An entity of a device or a method in the present disclosure includes a computer. When this computer executes a program, a function of the entity of a device or a method in the present disclosure is implemented. The computer includes, as a main hardware configuration, a processor that operates according to a program. The type of the processor is not specified as long as it can implement a function by executing a program. The processor is constituted by one or more electronic circuits including a semiconductor integrated circuit (IC) or large scale integration (LSI). Although it is called an IC or LSI here, what it is called may vary depending on the degree of integration; it may be called system LSI, very large scale integration (VLSI), or ultra large scale integration (USLI). A field programmable gate array (FPGA), which is programmed after the LSI is manufactured, or a reconfigurable logic device that can reconfigure the junction inside the LSI or set up the circuit partitions inside the LSI can also be used for the same purpose. The multiple electronic circuits may be integrated on a single chip or may be provided on multiple chips. The multiple chips may be aggregated into a single device or may be provided in multiple devices. A program may be recorded on a non-transitory computer-readable recording medium, such as a read only memory (ROM), an optical disk, and a hard disk drive, or may be recorded on a transitory computer-readable storage medium, such as a random access memory (RAM). A program may be stored in advance on a recording medium or may be provided to a recording medium or a storage medium via a wide area communication network, such as the Internet.

First Embodiment

An overview of the first embodiment will be described. In the aforementioned Patent Literature 1, notification to multiple screens considering the states of the vehicle occupants (constituent members of the occupants) is not taken into consideration. For example, although the driver may not want to show his or her privacy information to a passenger, with the display processing apparatus of Patent Literature 1 described above, the driver's privacy information may be seen by the passenger. Therefore, the first embodiment proposes a display processing device that does not display information associated with the driver on a display in the vehicle, thereby suitably protecting the driver's privacy.

In the first embodiment, information associated with the driver is regarded as the driver's privacy information. The privacy information includes personal information of the driver. The privacy information also includes various information that the driver wishes to keep secret from others (including passengers). For example, the privacy information may include e-mail information and social networking service (SNS) information related to the driver. The SNS information may include articles related to the driver's account and tweets and messages in a microblog.

FIG. 1 illustrates a configuration of a communication system 10 according to the first embodiment. The communication system 10 may also be regarded as an information processing system, in which a vehicle 12, a mobile terminal 14, and an information distribution server 16 communicate with each other via a communication network 18. The communication network 18 may be a LAN, a WAN, or the Internet, for example.

The information distribution server 16 is an information processing device that distributes various types of notification information (such as news, weather forecasts, and traffic congestion information) to the vehicle 12. The mobile terminal 14 is a smartphone or tablet terminal carried by the driver of the vehicle 12. The mobile terminal 14 is connected with an in-vehicle device of the vehicle 12 via Bluetooth (registered trademark) or a wireless LAN, for example. The mobile terminal 14 includes a display on which various information can be displayed.

Figure 2:
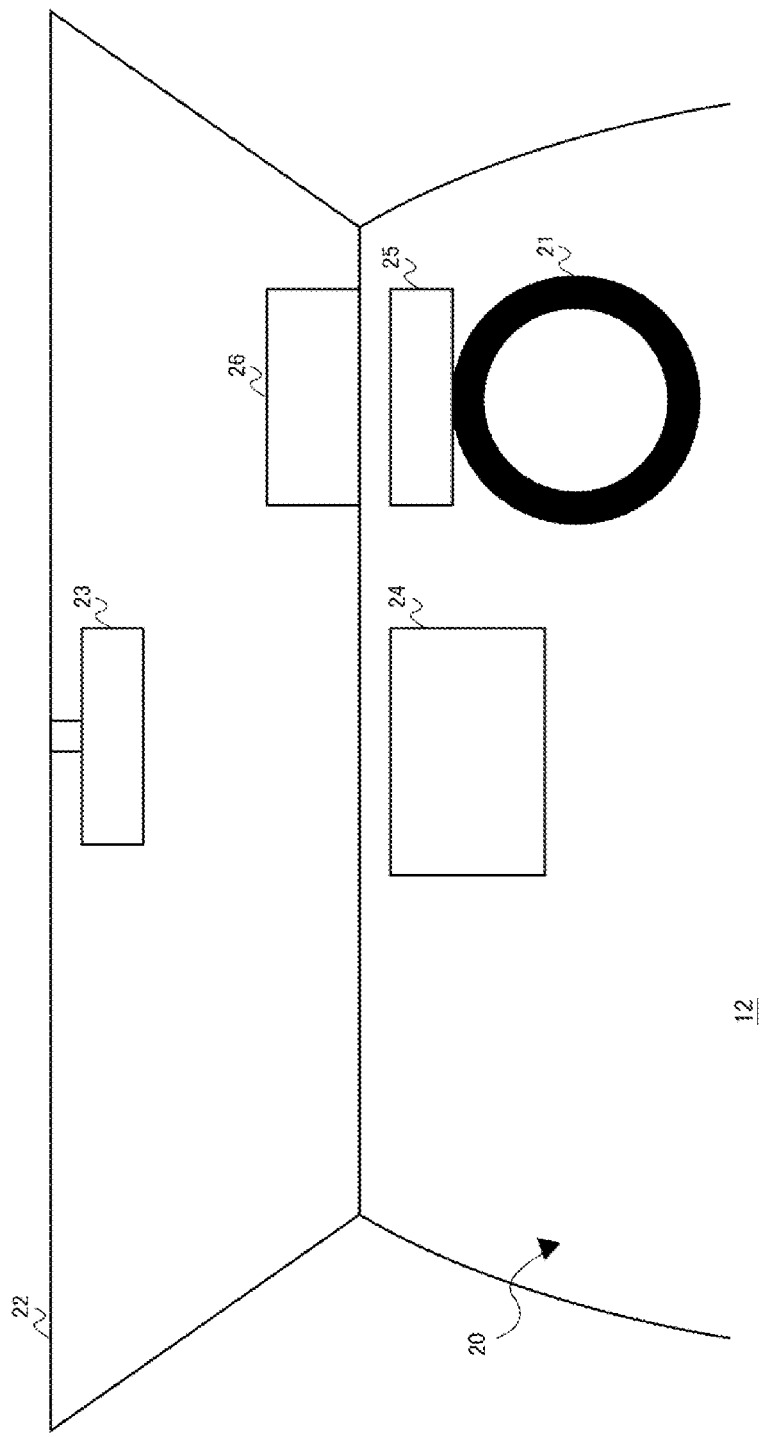
FIG. 2 schematically illustrates the cabin of the vehicle shown in FIG. 1.

FIG. 2 schematically illustrates the cabin of the vehicle 12 shown in FIG. 1. The driver drives the vehicle 12 by operating a steering wheel 21 while looking beyond a windshield 22, i.e., in front of the vehicle 12, and also looking behind the vehicle 12 in a rearview mirror 23. In the vehicle 12, multiple display screens are provided. The multiple display screens include a center display 24, a meter display 25, and a head-up display (HUD) 26.

The center display 24 is a display screen provided near the center of a dashboard 20 and may be, for example, a display screen for information related to car navigation. The meter display 25 is a display screen provided near an instrument panel of the car. The HUD 26 is a display screen that projects information directly onto the driver's field of vision and that may be provided on the windshield 22, for example.

Figure 3:
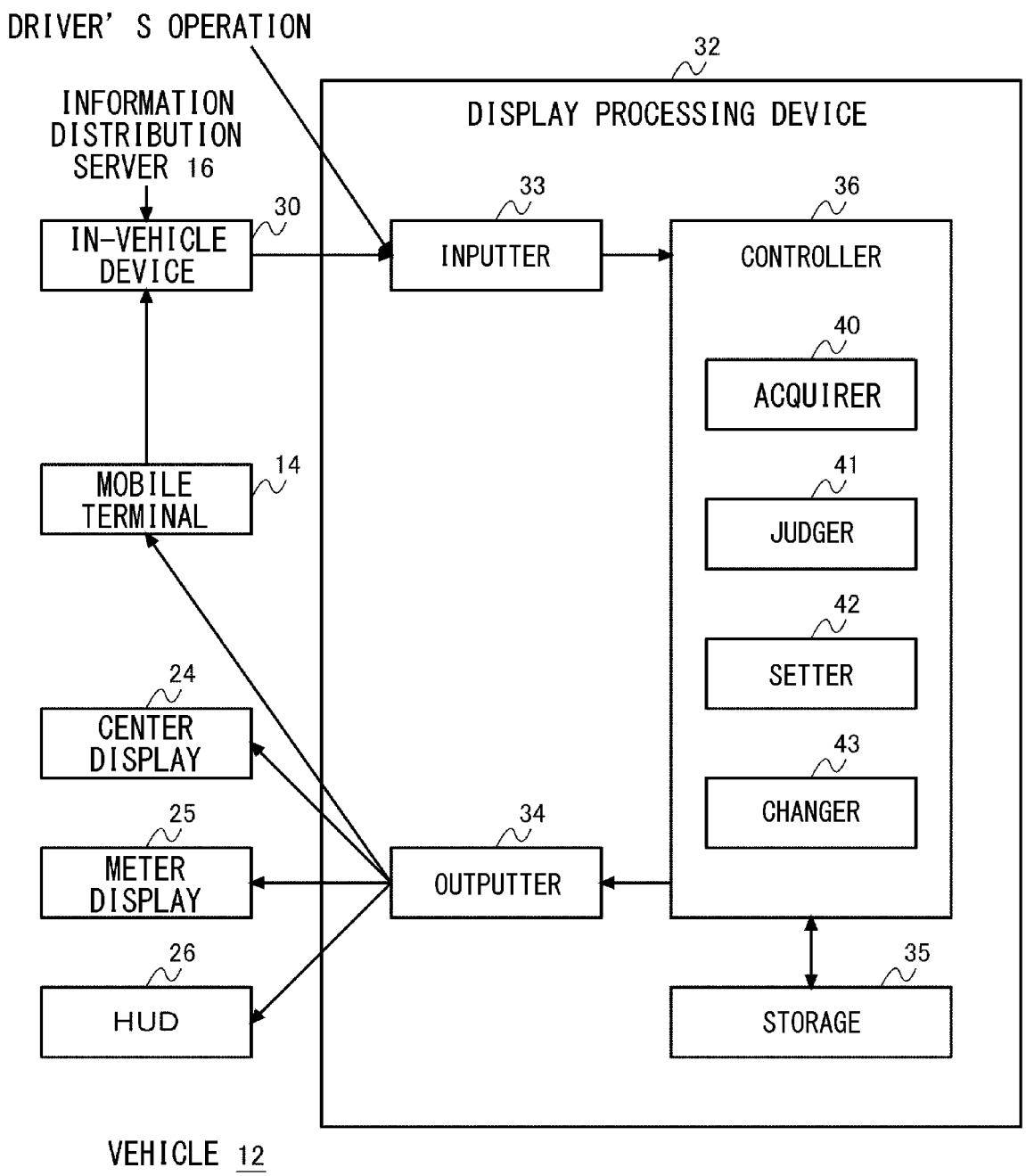
FIG. 3 is a block diagram that shows functional blocks of the vehicle shown in FIG. 1.

FIG. 3 is a block diagram that shows functional blocks of the vehicle 12 shown in FIG. 1. Each block shown in a block diagram in the present disclosure can be implemented by an element such as a CPU or memory of a computer or by a mechanism in terms of hardware, and by a computer program or the like in terms of software. FIG. 3 illustrates functional blocks implemented by coordination of those components. It will be understood by those skilled in the art that these functional blocks may be implemented in a variety of forms by combinations of hardware and software.

The vehicle 12 includes the center display 24, the meter display 25, the HUD 26, an in-vehicle device 30, and a display processing device 32. These devices are connected to each other via an on-board network of the vehicle 12.

The in-vehicle device 30 inputs notification information to the display processing device 32. Although FIG. 3 illustrates one in-vehicle device 30, the vehicle 12 may include multiple in-vehicle devices 30. The multiple in-vehicle devices 30 may include, for example, a car navigation device, an audio device, a driving support device, a traffic information receiver, and a communication device. For example, a first in-vehicle device 30 may input notification information delivered from the information distribution server 16 to the display processing device 32. A second in-vehicle device 30 may input notification information transmitted from a linked mobile terminal 14 (such as the driver's smartphone) to the display processing device 32.

The type, example, and priority level of notification information in the embodiment will be shown. The priority level is higher in order from the top, as the smaller the value, the higher the priority level.

(1) Emergency vehicle approach information, "Ambulance approaching from behind" or the like, priority level 10
(2) Near-miss information, "Watch out for pedestrians rushing out, 100 m ahead" or the like, priority level 20
(3) Road information, "speed limit 50 km", "construction, 100 m ahead", or the like, priority level 30
(4) Traffic congestion information, "Traffic jam, 5 km ahead" or the like, priority level 50
(5) Incoming call information, priority level 60
(6) Privacy information, e-mails, SNS messages, and the like, priority level 80
(7) Tomorrow's weather, priority level 90
(8) Song title of music to be played, priority level 100

The display processing device 32 is an information processing device that controls the display of notification information on multiple displays (the center display 24, meter display 25, HUD 26, and mobile terminal 14 in the embodiment) provided in the vehicle 12. The display processing device 32 may be implemented by an electronic control unit (ECU). The display processing device 32 includes an inputter 33, an outputter 34, a storage 35, and a controller 36.

To the inputter 33, notification information is input from the in-vehicle device 30. Further, to the inputter 33, a signal related to an operation by the driver is also input. An operation by the driver is a display switching operation for switching the notification information displayed on the center display 24, the meter display 25, or the HUD 26. For example, such operations by the driver include an operation to change the currently displayed notification information, an operation to erase the currently displayed notification information, and an operation to display information on another display. An operation by the driver may be implemented by voice or button operation.

The outputter 34 outputs signals related to the notification information to be displayed on the center display 24, the meter display 25, the HUD 26, and the mobile terminal 14, respectively to the center display 24, the meter display 25, the HUD 26, and the mobile terminal 14. The center display 24, the meter display 25, the HUD 26, and the mobile terminal 14 display the notification information based on the signals related to the notification information.

The storage 35 stores various program information, various setting information, specified values, and the like. The storage 35 is implemented by the memory or storage of the display processing device 32. For example, the storage 35 stores the priority level for each type of notification information.

The controller 36 controls the operation of the display processing device 32. The controller 36 is implemented by, for example, a processor (CPU or the like) of the display processing device 32. The controller 36 includes an acquirer 40, a judger 41, a setter 42, and a changer 43.

The functions of the multiple functional blocks in the controller 36 may be provided in a computer program (hereinafter, also referred to as a "display processing program"). The display processing program may be installed in the storage 35 of the display processing device 32 via a recording medium or a network. Also, the processor of the display processing device 32 may read the display processing program into a main memory and execute the program to perform the functions of the multiple functional blocks.

The acquirer 40 acquires, via the inputter 33, the notification information input from the in-vehicle device 30. The acquirer 40 also acquires an operation by the driver via the inputter 33.

Upon acquisition of notification information, the judger 41 determines the priority level of the notification information. When there are multiple pieces of notification information, the judger 41 compares the priority levels of the pieces of notification information to judge which priority level is higher. The judger 41 performs the judgment based on the priority level for each of the center display 24, meter display 25, HUD 26, and mobile terminal 14.

When notification information is newly acquired, the judger 41 compares the priority level of the currently displayed notification information and the priority level of the newly acquired notification information to judge which priority level is higher. Also, when pieces of notification information are acquired from multiple in-vehicle devices 30 at the same time, the judger 41 compares the priority levels of the pieces of notification information to judge which priority level is higher.

The judger 41 judges whether or not the notification information displayed on the center display 24, the meter display 25, or the HUD 26 has been changed by the user based on an operation by the driver. That is, the judger 41 judges whether or not the display of the notification information has been changed based on an operation by the driver. The judger 41 determines a display on which the notification information is to be changed according to an operation by the driver, from among the center display 24, meter display 25, HUD 26, and mobile terminal 14. For example, when the driver has changed the song title on an audio device, the judger 41 may judge that the notification information displayed on the center display 24 is to be changed according to the operation by the driver.

The setter 42 sets the notification information to be displayed on the center display 24, meter display 25, HUD 26, and mobile terminal 14, based on the priority level of the notification information. The setter 42 sets the notification information to be displayed, for each of the center display 24, meter display 25, HUD 26, and mobile terminal 14.

When new notification information is acquired and when the priority level of the new notification information is higher than the priority level of the currently displayed notification information, the setter 42 sets the new notification information as the notification information to be displayed on the center display 24, meter display 25, HUD 26, and mobile terminal 14.

When new notification information is acquired and when the priority level of the new notification information is lower than the priority level of the currently displayed notification information, the setter 42 sets the currently displayed notification information as the notification information to be displayed on the center display 24, meter display 25, HUD 26, and mobile terminal 14.

When new notification information is acquired and when the priority level of the new notification information is lower than the priority level of the currently displayed notification information, the setter 42 sets the new notification information as notification information to be displayed next to the currently displayed notification information. Alternatively, when new notification information is acquired and when the priority level of the new notification information is lower than the priority level of the currently displayed notification information, the setter 42 may cancel the display of the new notification information, i.e., may set the new notification information to be not displayed.

Thus, when new notification information is acquired, the setter 42 determines which notification information is to be preferentially displayed based on the priority level of each notification information and sets the notification information to be displayed on the center display 24, meter display 25, HUD 26, and mobile terminal 14. In other words, when notification information is acquired, the setter 42 mediates, based on the priority level of the notification information, the notification information to be displayed on the center display 24, meter display 25, HUD 26, and mobile terminal 14 and sets the notification information with the highest priority level as the notification information to be displayed on the center display 24, meter display 25, HUD 26, and mobile terminal 14.

The setter 42 also sets the notification information to be displayed on the center display 24, meter display 25, HUD 26, and mobile terminal 14, based on an operation by the driver. When an operation is performed by the driver, the setter 42 sets the notification information to be displayed on one display among the center display 24, meter display 25, HUD 26, and mobile terminal 14, based on the operation by the driver. Further, based on the notification information to be displayed on the one display, the setter 42 sets the notification information to be displayed on another display. Also when setting the notification information to be displayed on the center display 24, meter display 25, HUD 26, and mobile terminal 14 based on an operation by the driver, the setter 42 sets (mediates) the notification information based on the priority level.

The changer 43 may also be regarded as a display controller, which changes the notification information on the center display 24, meter display 25, HUD 26, and mobile terminal 14 based on the notification information set by the setter 42. More specifically, the changer 43 changes the display of the notification information on the center display 24, meter display 25, HUD 26, and mobile terminal 14 based on the result of mediation by the setter 42 and on an operation by the driver. When changing the notification information to be displayed on one display based on an operation by the driver, the changer 43 changes the notification information to be displayed on another display based on the change in the notification information to be displayed on the one display.

For example, it is assumed that "Watch out for pedestrians rushing out, 100 m ahead" as the notification information regarding near-misses is displayed on the center display 24, the meter display 25, and the HUD 26. In this situation, when the driver inputs an operation to cancel the near-miss notification information to the center display 24, the changer 43 sets the notification information to be displayed on the center display 24 based on the priority level. Accordingly, the next notification information based on the priority level is displayed on the center display 24. For example, the next notification information for the center display 24 may be notification information regarding the traffic congestion information of "Traffic jam, 5 km ahead".

In this case, based on the operation by the driver, the changer 43 changes the notification information displayed on the center display 24 from "Watch out for pedestrians rushing out, 100 m ahead" to "Traffic jam, 5 km ahead". Also, according to the change in the notification information displayed on the center display 24, the changer 43 sets the notification information on the meter display 25 and the HUD 26, i.e., the other displays, based on the priority level. For example, the changer 43 may change the display from "Watch out for pedestrians rushing out, 100 m ahead" to "Traffic jam, 5 km ahead" on all the center display 24, meter display 25, and HUD 26.

On each of the center display 24, the meter display 25, the HUD 26, and the mobile terminal 14, a different piece of notification information may be displayed based on the priority level of one or more pieces of notification information to be displayed on each display. Also, an operation by the user may be input not only to the center display 24 but also to the meter display 25 and the HUD 26. As the configuration for linking the center display 24, the meter display 25, and the HUD 26 for a change in notification information, a configuration described in Patent Literature 1 (Japanese Unexamined Patent Application Publication No. 2019-139518) described above can be appropriately employed.

In the first embodiment, when the notification information displayed on one display among multiple displays (such as the center display 24, the meter display 25, and the HUD 26) is to be changed to another notification information based on an operation by the driver and when an occupant other than the driver, i.e., a passenger, is present in the vehicle 12 and when the another notification information is information associated with the driver (the driver's privacy information in the embodiment), the setter 42 restricts the display of the another notification information on the one display. The "another notification information" here may also be regarded as new notification information to be displayed in place of the notification information that has been displayed.

Restricting the display of the another notification information may be prohibiting the display of the another notification information on the one display or may be not displaying the another notification information. It also includes displaying the another notification information in a manner that cannot be visually recognized by a passenger or that is difficult for a passenger to visually recognize. When the display of the another notification information on the one display is restricted, the changer 43 restrains the display of the another notification information also on another display in addition to the one display. At least part of the processing performed by the setter 42 in the present specification may be configured to be performed by the judger 41.

There will now be described an operation of the display processing device 32 having the configuration set forth above.

Figure 4:
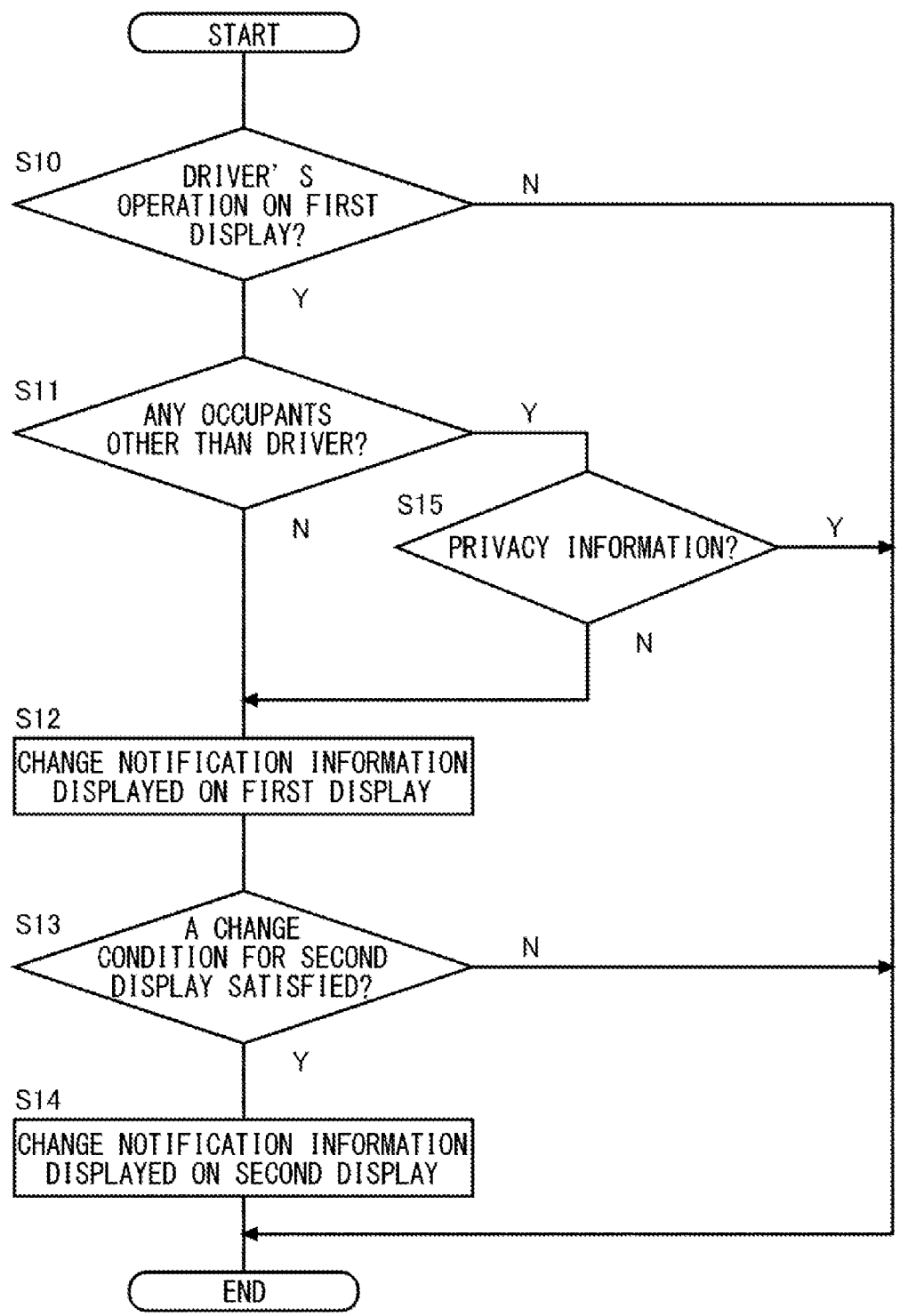
FIG. 4 is a flowchart that shows an operation of a display processing device in the first embodiment.

FIG. 4 is a flowchart that shows an operation of the display processing device 32 in the first embodiment. It is assumed here that, to the center display 24 as a first display, an operation by the driver for ordering a change of the notification information displayed on the center display 24 has been input. The judger 41 detects the operation by the driver. Hereinafter, the notification information displayed on the center display 24 at the time of input of an operation by the driver will be referred to as "displayed notification information", and the notification information to be displayed next to the displayed notification information will be referred to as "new notification information".

Upon detection of an input of an operation by the driver for ordering a change of the notification information on the center display 24 (Y at S10), the judger 41 judges whether or not an occupant other than the driver is present in the vehicle 12. For example, the judger 41 may judge whether or not an occupant other than the driver is present in the vehicle cabin by analyzing an image captured by a camera, not illustrated, that captures images of the interior of the vehicle cabin, using a publicly-known method.

When there are no occupants other than the driver in the vehicle 12 (N at S11), the setter 42 sets new notification information as notification information to be newly displayed on the center display 24. The changer 43 changes the notification information displayed on the center display 24 from the displayed notification information to the new notification information (S12).

Here, the meter display 25 is set as a second display. Based on the priority level of the new notification information displayed on the center display 24 and the priority level of the notification information currently displayed on the meter display 25 as the second display, the setter 42 judges whether or not a change condition for the notification information displayed on the meter display 25 is satisfied. When the change condition for the notification information displayed on the meter display 25 is satisfied (Y at S13), the changer 43 changes the notification information displayed on the meter display 25 (S14).

For the process of S14, a process described in Patent Literature 1 (Japanese Unexamined Patent Application Publication No. 2019-139518) described above can be employed. For example, when the priority level of the new notification information is relatively high, the changer 43 may change the notification information displayed on the meter display 25 from the notification information that has been displayed to the new notification information. When the change condition for the notification information displayed on the meter display 25 is not satisfied (N at S13), the process of S14 is skipped.

When an occupant other than the driver is present in the vehicle 12 (Y at S11), the setter 42 judges whether or not the new notification information corresponds to the driver's privacy information. The setter 42 may judge whether or not the new notification information corresponds to the driver's privacy information based on attribute information (such as header information, metadata, and the title) related to the new notification information. When the setter 42 confirms that the new notification information is e-mail information or SNS information related to the driver, the setter 42 judges that the new notification information corresponds to the driver's privacy information Hereinafter, road information, traffic congestion information, and the like other than the privacy information will be referred to as "general information". When the new notification information corresponds to the general information (N at S15), the process proceeds to S12, and the changer 43 changes the notification information displayed on the center display 24 from the displayed notification information to the new notification information. When the new notification information corresponds to the driver's privacy information (Y at S15), the subsequent processes are skipped, and the process of FIG. 4 terminates. That is, the new notification information is not displayed on either the center display 24 or the meter display 25. When an input of an operation by the driver for ordering a change of the notification information on the center display 24 is not detected (N at S10), the subsequent processes are skipped, and the process of FIG. 4 terminates.

Figure 5A:
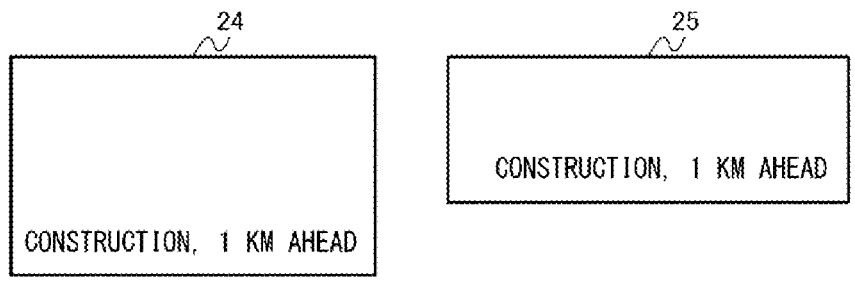
FIGS. 5A, 5B, 5C, 5D, and 5E show examples of display of notification information.

FIGS. 5A, 5B, 5C, 5D, and 5E show examples of display of notification information. FIG. 5A shows a display example before a change and specifically shows notification information (road information as the general information) displayed on the center display 24 and the meter display 25 when an operation by the driver for changing the notification information is input to the center display 24. FIGS. 5B, 5C, 5D, and 5E show display examples after the operation by the driver for changing the notification information is input. In this example, the changer 43 of the display processing device 32 also changes the notification information displayed on the meter display 25 in line with the change of the notification information displayed on the center display 24.

Figure 5B:
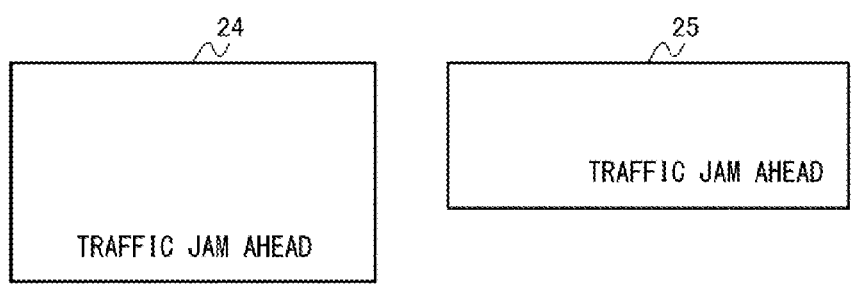
Figure 5C:
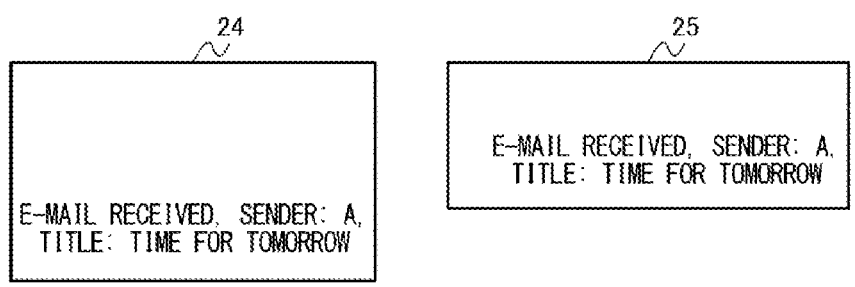
Figure 5D:
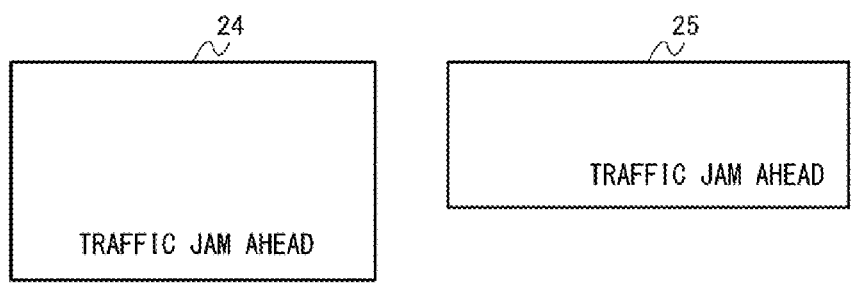

FIG. 5B shows that, when the new notification information corresponds to the general information and when there are no passengers, the new notification information (traffic congestion information as the general information) is newly displayed on the center display 24 and the meter display 25. FIG. 5C shows that, when the new notification information corresponds to the driver's privacy information and when there are no passengers, the new notification information (e-mail information as the privacy information) is newly displayed on the center display 24 and the meter display 25. FIG. 5D shows that, when the new notification information corresponds to the general information and when a passenger is present, the new notification information (traffic congestion information as the general information) is newly displayed on the center display 24 and the meter display 25.

Figure 5E:
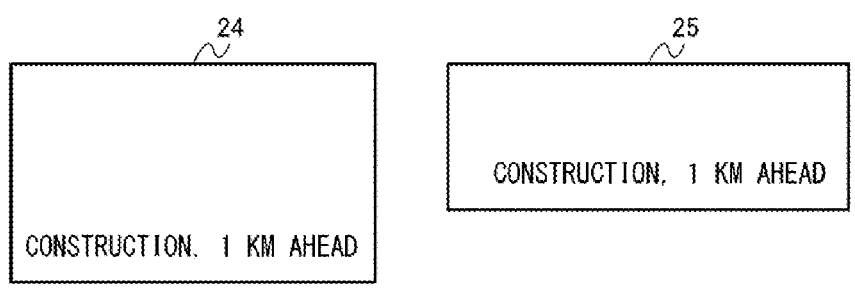

FIG. 5E shows that, when the new notification information corresponds to the driver's privacy information and when a passenger is present, the setter 42 sets the display of the new notification information to be restricted. According to the setting by the setter 42, the changer 43 does not display the new notification information on the center display 24 and the meter display 25 and maintains the display of the original notification information (road information). As a modification, when the display of the new notification information is restricted, the changer 43 may not display any notification information on the center display 24 and the meter display 25 or, in other words, may erase the notification information from the center display 24 and the meter display 25.

With the display processing device 32 of the first embodiment, multiple displays mounted on the vehicle 12 can be utilized to suitably present each notification information to the driver based on the priority level of the notification information. In addition, the driver's privacy information can be prevented from being seen by a passenger, and the driver's privacy can be protected.

A modification of the first embodiment will be described. When the notification information displayed on one display is to be changed to another notification information based on an operation by the driver and when the display of the another notification information on the one display is restricted and when notification information to be displayed next to the another notification information (hereinafter, referred to as "next notification information") has been acquired, the setter 42 of the display processing device 32 sets the next notification information as the notification information to be displayed on the one display.

Figure 6:
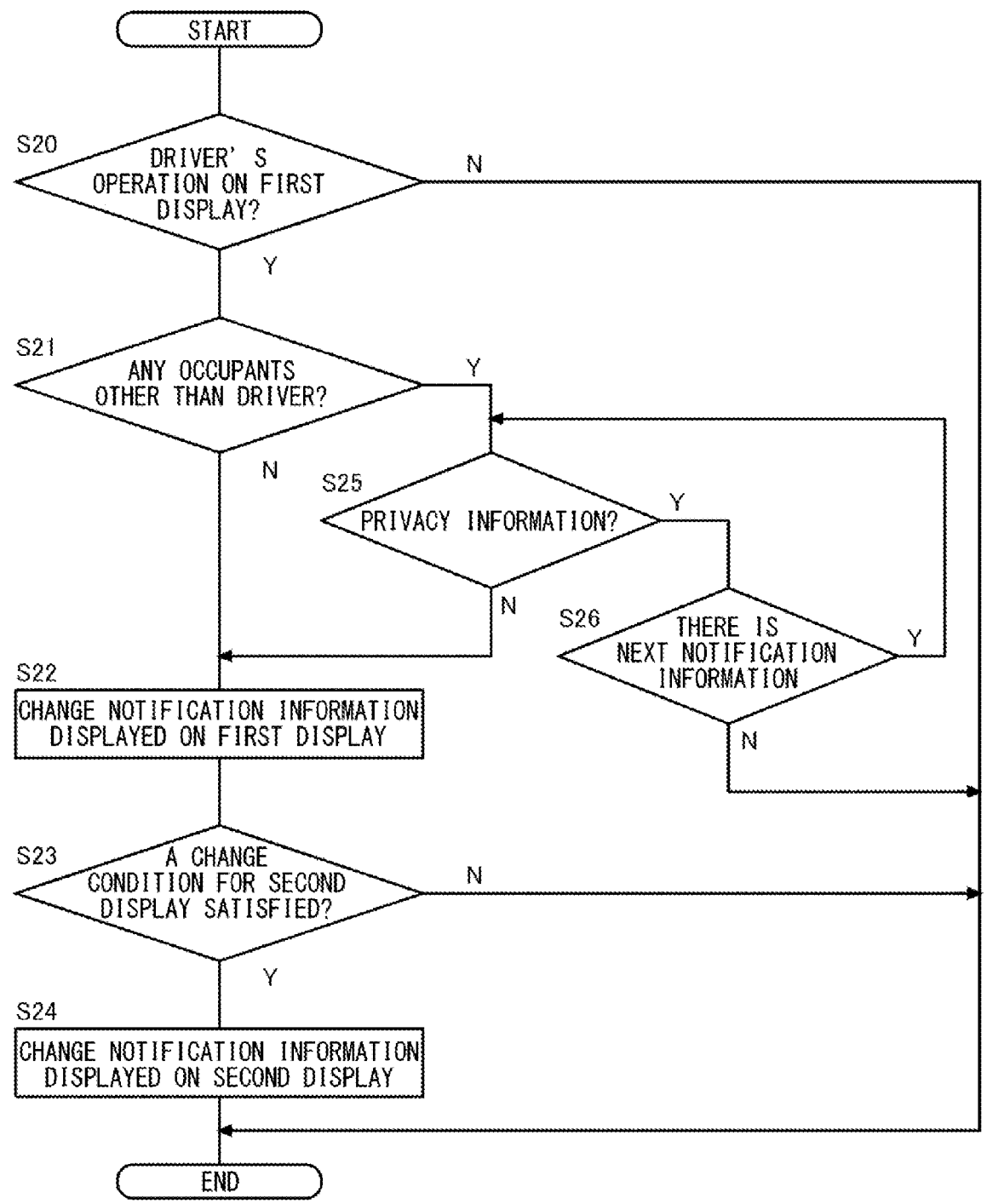
FIG. 6 is a flowchart that shows an operation of a display processing device in a modification of the first embodiment.

FIG. 6 is a flowchart that shows an operation of the display processing device 32 in the modification of the first embodiment. The processes from S20 to S25 in FIG. 6 are the same as the processes from S10 to S15 in FIG. 4, and repetitive description will be omitted. When an occupant other than the driver is present in the vehicle 12 (Y at S21) and when the new notification information to be displayed next to the displayed notification information corresponds to the driver's privacy information (Y at S25), the setter 42 judges whether or not the next notification information to be displayed next to the new notification information has been acquired.

When the next notification information has been acquired (Y at S26), the process returns to S25, and the setter 42 judges whether or not the next notification information corresponds to the driver's privacy information. When the next notification information has not been acquired (N at S26), the subsequent processes are skipped, and the process of FIG. 6 terminates. That is, the new notification information is not displayed on either the center display 24 or the meter display 25, and the next notification information is also not displayed on either the center display 24 or the meter display 25.

Figure 7A:
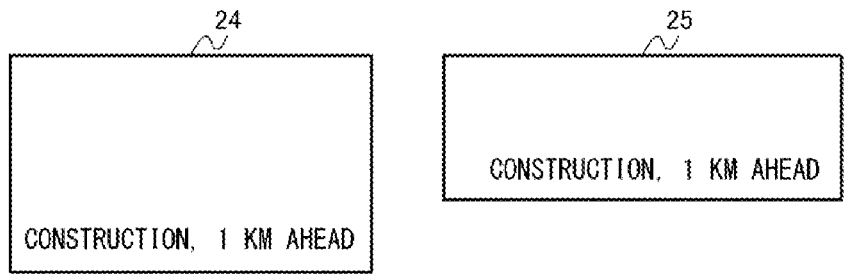
FIGS. 7A, 7B, 7C, 7D, and 7E show examples of display of notification information.

FIGS. 7A, 7B, 7C, 7D, and 7E show examples of display of notification information. FIG. 7A corresponds to FIG. 5A and shows a display example before a change. FIGS. 7B, 7C, 7D, and 7E show display examples after a change operation by the driver is input.

Figure 7B:
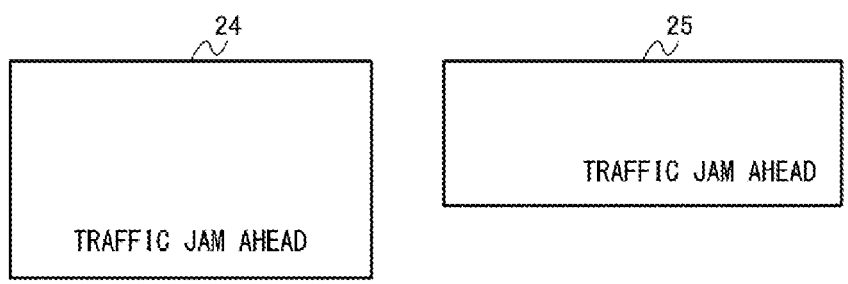
Figure 7C:
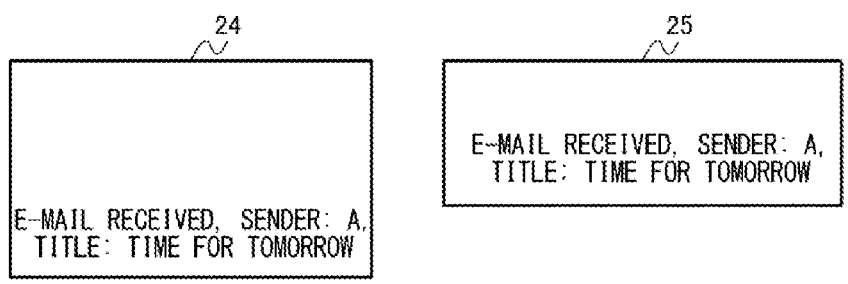
Figure 7D:
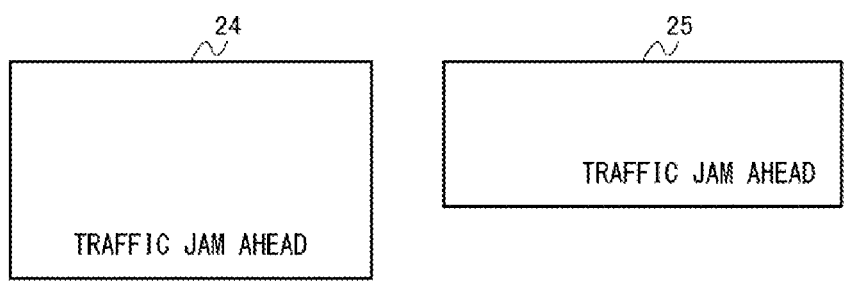
Figure 7E:
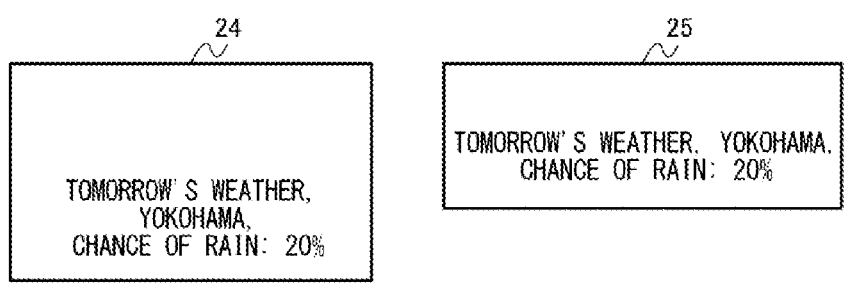

FIG. 7B corresponds to FIG. 5B and shows a display example of the case where the new notification information corresponds to the general information and where there are no passengers. FIG. 7C corresponds to FIG. 5C and shows a display example of the case where the new notification information corresponds to the driver's privacy information and where there are no passengers. FIG. 7D corresponds to FIG. 5D and shows a display example of the case where the new notification information corresponds to the general information and where a passenger is present. FIG. 7E shows a display example of the case where the new notification information corresponds to the driver's privacy information and where a passenger is present and where there is the next notification information.

When the display of the new notification information is restricted and when there is the next notification information and when the next notification information does not correspond to the privacy information, the setter 42 sets the next notification information (e.g., weather forecast as the general information) as the notification information displayed on the center display 24, as shown in FIG. 7E. The changer 43 displays the next notification information on the center display 24 and also displays the next notification information on the meter display 25. When the next notification information corresponds to the privacy information, the display of the center display 24 and the meter display 25 is not updated, as shown in FIG. 5E, or the display of the notification information on the center display 24 and the meter display 25 is erased.

According to this modification, while protecting the driver's privacy, notification information that is not problematic in terms of protection of the driver's privacy can be presented to an occupant.

Another modification of the first embodiment will be described. In the first embodiment, the driver's privacy information is used as an example of information associated with the driver of which the display on a display in the vehicle 12 is restricted. However, such information associated with the driver of which the display on a display in the vehicle 12 is restricted is not limited to the driver's privacy information. The information associated with the driver of which the display on a display in the vehicle 12 is restricted may be a type of information specified in advance by the driver. For example, as the information associated with the driver of which the display on a display in the vehicle 12 is restricted, information on incoming calls to the mobile terminal 14 or the song title of music to be played may be specified.

The driver may specify information other than the privacy information that he or she does not want a passenger to see, as information to be dealt with in the same way as the privacy information and as information of which the display on a display in the vehicle 12 is restricted. For example, as the information other than the privacy information that the driver does not want a passenger to see, advertising information or junk e-mails delivered from an external device to the mobile terminal 14 may be specified. According to this modification, the information other than the privacy information that the driver does not want a passenger to see can be made undisplayable on a display in the vehicle 12, and the convenience of the display processing device 32 can be enhanced.

Second Embodiment

The second embodiment of the present disclosure will be described mainly for features different from those in the first embodiment, and description of features in common will be omitted. A feature in the second embodiment may be arbitrarily combined with a feature in the first embodiment and a feature in the modifications, as a matter of course.

The inventor considered that whether or not the driver's privacy information may be disclosed could vary depending on who the passenger is. For example, a driver may consider it acceptable to disclose privacy information to his or her own family members but may consider it unacceptable to disclose privacy information to his or her work colleagues. Therefore, the display processing device 32 of the second embodiment displays the driver's privacy information on a display when the passenger is a person who is permitted by the driver to view the privacy information. On the other hand, the display processing device 32 of the second embodiment restricts the display of the driver's privacy information when the passenger is not a person who is permitted by the driver to view the privacy information.

The storage 35 of the display processing device 32 stores information, such as facial feature information, regarding a person who is permitted to view the driver's privacy information, which is determined in advance by the driver. The setter 42 of the display processing device 32 identifies a person present in the vehicle cabin by analyzing an image captured by a camera, not illustrated, that captures images of the interior of the vehicle cabin, using a publicly-known method. Through the identification processing, the setter 42 detects whether the person present in the vehicle cabin is a person who is permitted to view the driver's privacy information.

When the notification information displayed on one display provided in the vehicle 12 is to be changed to another notification information based on an operation by the driver and when an occupant other than the driver in the vehicle 12 is a person who is permitted to view the driver's privacy information, even if the another notification information corresponds to the driver's privacy information, the setter 42 sets the another notification information as the notification information to be displayed on the one display.

Figure 8:
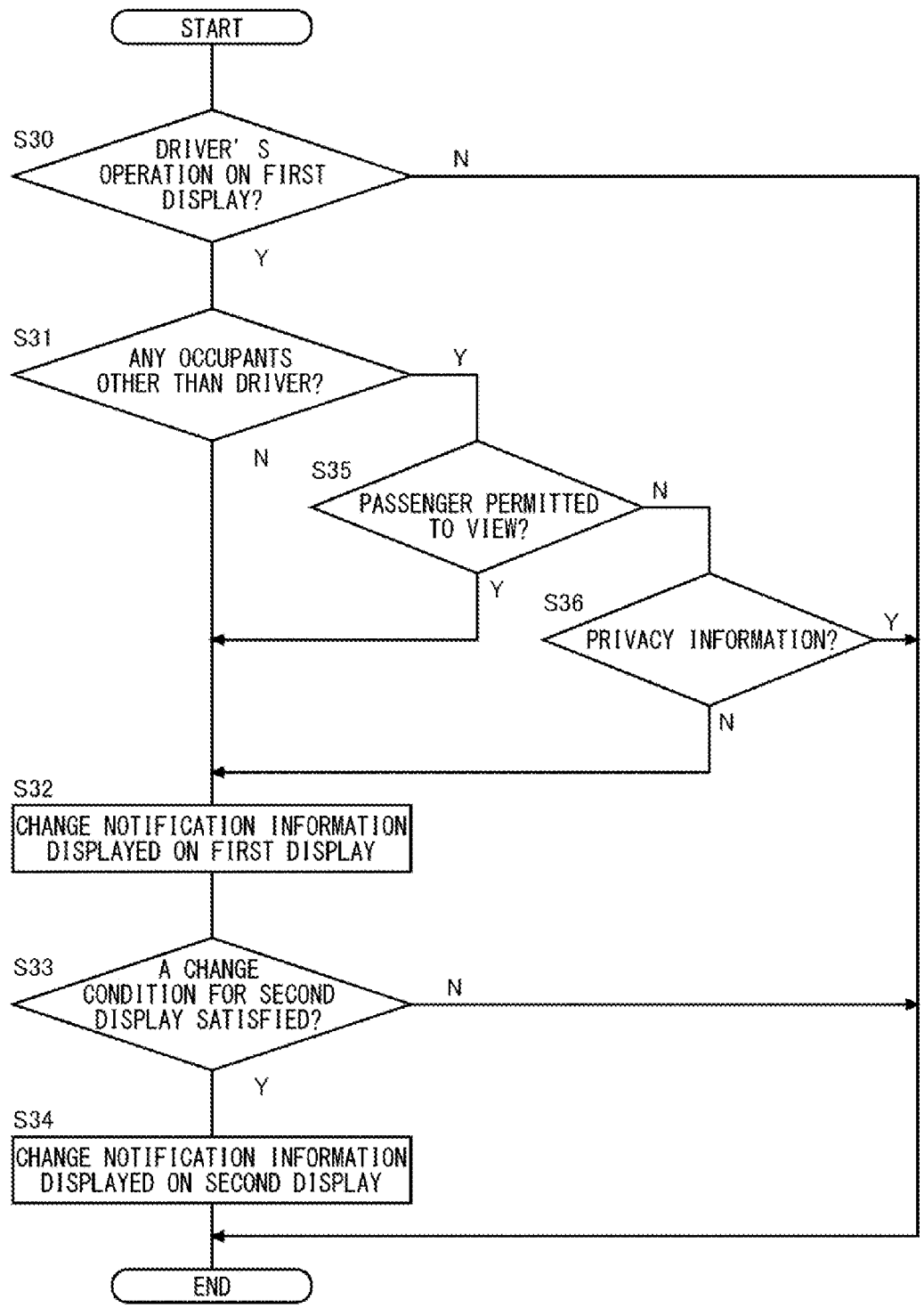
FIG. 8 is a flowchart that shows an operation of a display processing device in a second embodiment.

FIG. 8 is a flowchart that shows an operation of the display processing device 32 in the second embodiment. The processes from S30 to S34 in FIG. 8 are the same as the processes from S10 to S14 in FIG. 4 of the first embodiment, and repetitive description will be omitted. When an occupant (a passenger) other than the driver is present in the vehicle 12 (Y at S31), the setter 42 judges whether or not the passenger is a person who is permitted to view the driver's privacy information. When the passenger is a person who is permitted to view the driver's privacy information (Y at S35), the process proceeds to S32 regardless of whether or not the new notification information corresponds to the privacy information, and the changer 43 changes the notification information displayed on the center display 24 from the displayed notification information to the new notification information.

When the passenger is not a person who is permitted to view the driver's privacy information (N at S35), the setter 42 judges whether or not the new notification information corresponds to the driver's privacy information. When the new notification information corresponds to the general information (N at S36), the process proceeds to S32, and the changer 43 changes the notification information displayed on the center display 24 from the displayed notification information to the new notification information. When the new notification information corresponds to the privacy information (Y at S36), the subsequent processes are skipped, and the process of FIG. 8 terminates. That is, the new notification information is not displayed on either the center display 24 or the meter display 25.

Examples of the display of notification information in the second embodiment will be described. When the new notification information corresponds to the general information and when there are no passengers, the new notification information (such as traffic congestion information as the general information) is newly displayed on the center display 24 and the meter display 25, as shown in FIG. 5B. When the new notification information corresponds to the driver's privacy information and when there are no passengers, the new notification information (such as e-mail information as the privacy information) is newly displayed on the center display 24 and the meter display 25, as shown in FIG. 5C.

When the new notification information corresponds to the general information and when there is a passenger who is not permitted to view the privacy information, the new notification information (such as traffic congestion information as the general information) is newly displayed on the center display 24 and the meter display 25, as shown in FIG. 5D. When the new notification information corresponds to the driver's privacy information and when there is a passenger who is not permitted to view the privacy information, the new notification information is not displayed on the center display 24 and the meter display 25, and the display of the original road information is maintained, as shown in FIG. 5E. As a modification, the notification information displayed on the center display 24 and the meter display 25 may be erased.

When the new notification information corresponds to the general information and when all the passengers are permitted to view the privacy information, the display mode is the same as in the case where there are no passengers. That is, as shown in FIG. 5B, the new notification information (such as traffic congestion information as the general information) is newly displayed on the center display 24 and the meter display 25. Also when the new notification information corresponds to the privacy information and when all the passengers are permitted to view the privacy information, the display mode is the same as in the case where there are no passengers. That is, as shown in FIG. 5C, the new notification information (such as e-mail information as the privacy information) is newly displayed on the center display 24 and the meter display 25.

With the display processing device 32 of the second embodiment, when a passenger is a person who is permitted by the driver to view the driver's privacy information, notification information including the driver's privacy information can be presented to the driver and the passenger in the vehicle 12.

Third Embodiment

The third embodiment of the present disclosure will be described mainly for features different from those in the first embodiment, and description of features in common will be omitted. A feature in the third embodiment may be arbitrarily combined with a feature in each of the aforementioned embodiments and a feature in the modifications, as a matter of course.

The mobile terminal 14 brought by the driver into the vehicle 12 can communicate and cooperate with the in-vehicle device 30. In the future, it is expected that the notification information to the mobile terminal 14 can be displayed on a display in the vehicle 12. In such a case, the driver's privacy information sent to the mobile terminal 14 that the driver does not want to disclose to others may be displayed on the display. Therefore, the display processing device 32 of the third embodiment displays, when the in-vehicle device 30 and the mobile terminal 14 are linked, notification information including the driver's privacy information as notification information on the display of the mobile terminal 14.

When the notification information displayed on one display provided in the vehicle 12 is to be changed to another notification information based on an operation by the driver and when the display of the another notification information on the one display is restricted and when the communication with the mobile terminal 14 has been established, the setter 42 of the display processing device 32 sets the another notification information as the notification information to be displayed on the mobile terminal 14.

FIG. 9 is a flowchart that shows an operation of the display processing device 32 in the third embodiment. The processes from S40 to S45 in FIG. 9 are the same as the processes from S10 to S15 in FIG. 4, and repetitive description will be omitted. When an occupant other than the driver is present in the vehicle 12 (Y at S41) and when the new notification information to be displayed next to the displayed notification information corresponds to the driver's privacy information (Y at S45), the setter 42 judges whether or not the mobile terminal 14 and the in-vehicle device 30 are linked.

When the mobile terminal 14 and the in-vehicle device 30 are linked (Y at S46), the setter 42 sets the new notification information as the notification information to be displayed on the mobile terminal 14. In this case, the outputter 34 of the display processing device 32 transmits the data of the new notification information only to the mobile terminal 14 and displays the new notification information only on the display of the mobile terminal 14 (S47). When the mobile terminal 14 and the in-vehicle device 30 are not linked (N at S46), the subsequent processes are skipped, and the process of FIG. 9 terminates. That is, the new notification information is not displayed on any of the center display 24, the meter display 25, or the display of the mobile terminal 14.

Figure 10A:
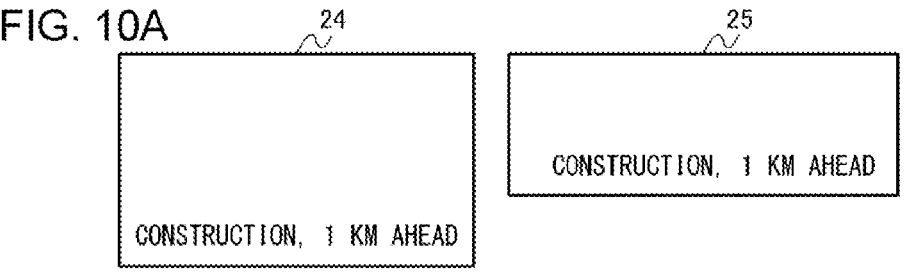
FIGS. 10A, 10B, 10C, 10D, and 10E show examples of display of notification information.

FIGS. 10A, 10B, 10C, 10D, and 10E show examples of display of notification information. FIG. 10A corresponds to FIG. 5A and shows a display example before a change. FIGS. 10B, 10C, 10D, and 10E show display examples after a change operation by the driver is input.

Figure 10B:
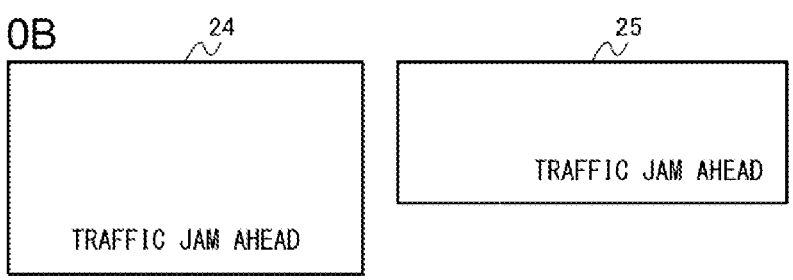
Figure 10C:
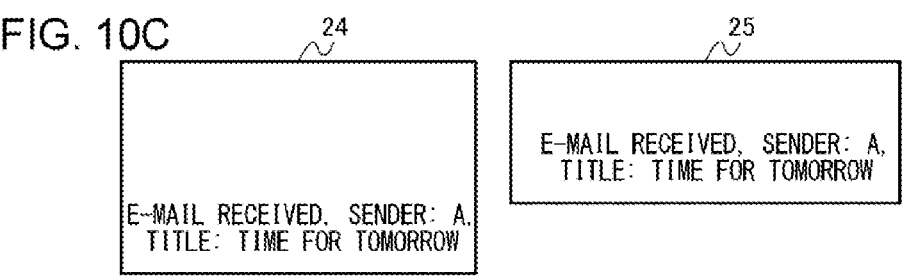
Figure 10D:
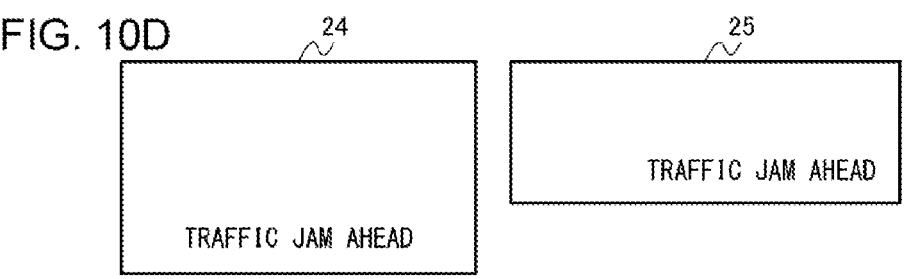
Figure 10E:
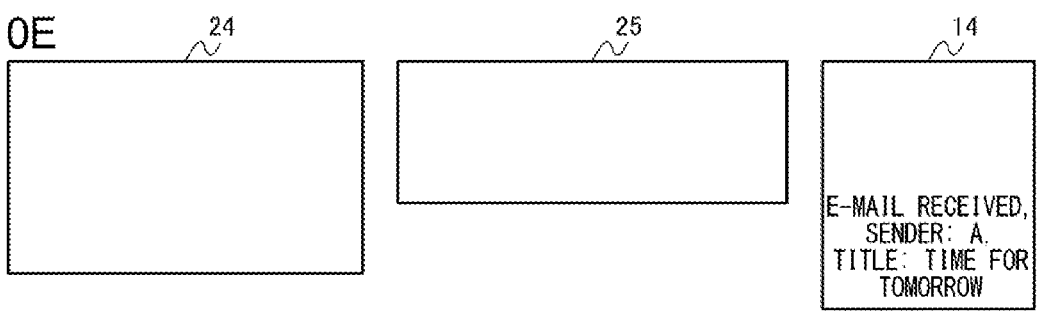

FIG. 10B corresponds to FIG. 5B and shows a display example of the case where the new notification information corresponds to the general information and where there are no passengers. FIG. 10C corresponds to FIG. 5C and shows a display example of the case where the new notification information corresponds to the driver's privacy information and where there are no passengers. FIG. 10D corresponds to FIG. 5D and shows a display example of the case where the new notification information corresponds to the general information and where a passenger is present. FIG. 10E shows a display example of the case where the new notification information corresponds to the driver's privacy information and where a passenger is present and where the mobile terminal 14 is linked.

As shown in FIG. 10E, when the display of the new notification information is restricted and when the mobile terminal 14 is linked, the setter 42 displays the new notification information on the display of the mobile terminal 14.

In this case, the changer 43 may erase the display of the notification information on the center display 24 and the meter display 25 or may maintain the display of the notification information before the change, i.e., "construction, 1 km ahead".

With the display processing device 32 of the third embodiment, while protecting the driver's privacy, the driver's privacy information can be sent to the driver himself or herself.

A modification of the third embodiment will be described. In the third embodiment described above, when the display of notification information on a display provided in the vehicle 12 is restricted, the setter 42 of the display processing device 32 displays the notification information on the display of the mobile terminal 14 linked with the in-vehicle device 30. As a modification, when the notification information displayed on one display provided in the vehicle 12 is to be changed to another notification information based on an operation by the driver and when the display of the another notification information on the one display is restricted, the setter 42 may set the another notification information as notification information to be displayed on a display specified in advance by the driver.

Figure 11:
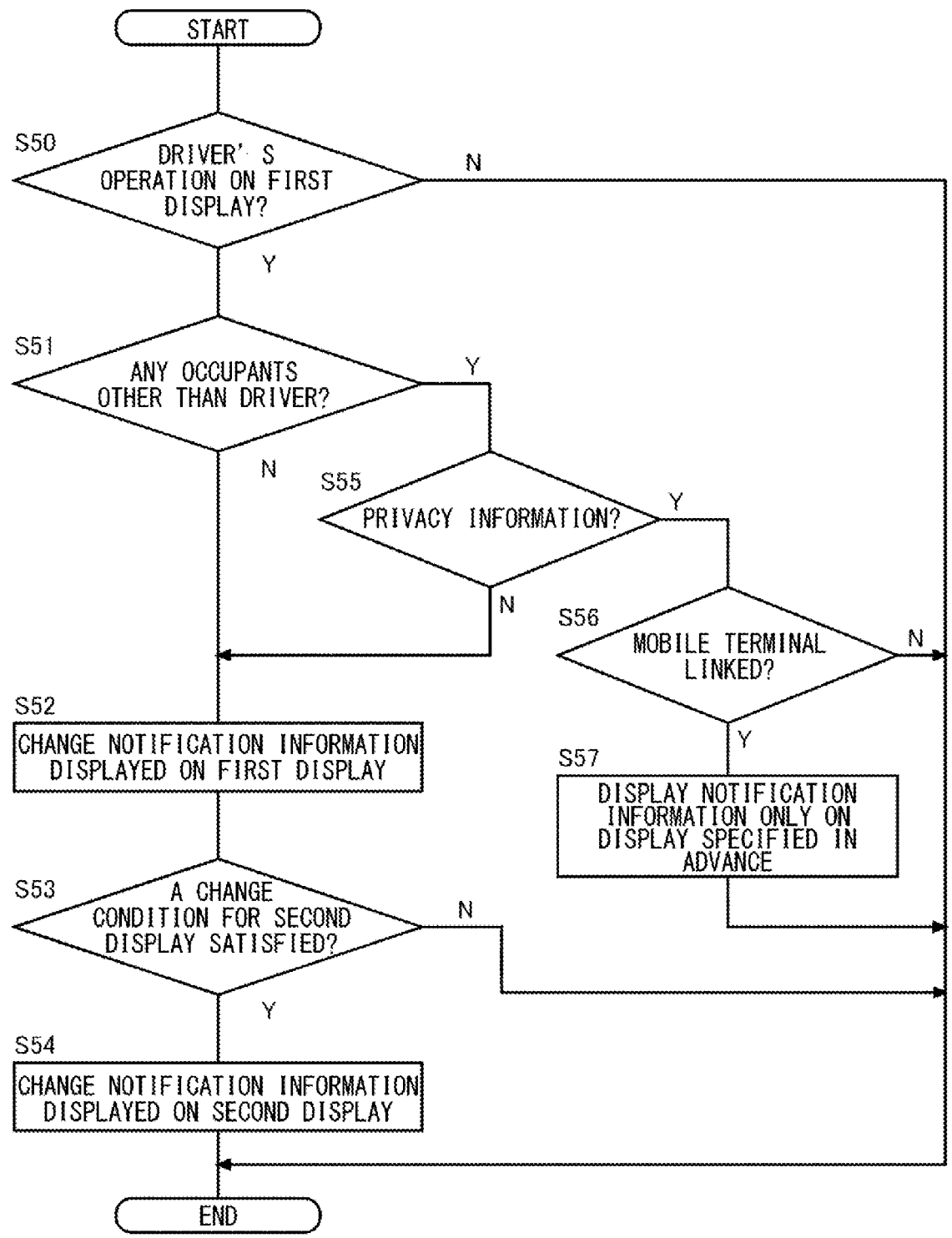
FIG. 11 is a flowchart that shows an operation of a display processing device in a modification of the third embodiment.

FIG. 11 is a flowchart that shows an operation of the display processing device 32 in the modification of the third embodiment. The processes from S50 to S56 in FIG. 11 are the same as the processes from S40 to S46 in FIG. 9, and repetitive description will be omitted. When an occupant other than the driver is present in the vehicle 12 and when the new notification information to be displayed next to the displayed notification information corresponds to the driver's privacy information and when the mobile terminal 14 and the in-vehicle device 30 are linked (Y at S56), the setter 42 displays the notification information only on a display specified in advance by the driver (S57).

Figure 12A:
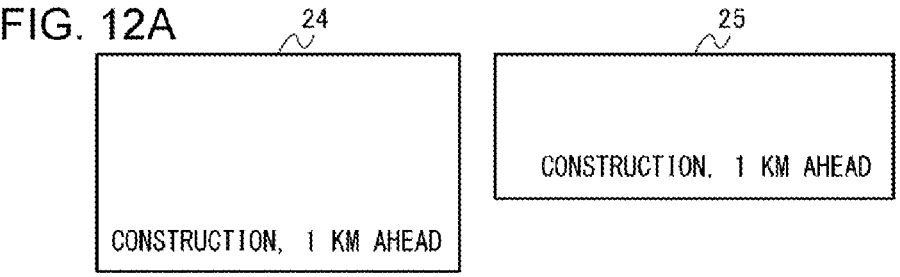
FIGS. 12A, 12B, 12C, 12D, and 12E show examples of display of notification information.

FIGS. 12A, 12B, 12C, 12D, and 12E show examples of display of notification information. FIG. 12A corresponds to FIG. 5A and shows a display example before a change. FIGS. 12B, 12C, 12D, and 12E show display examples after a change operation by the driver is input.

Figure 12B:
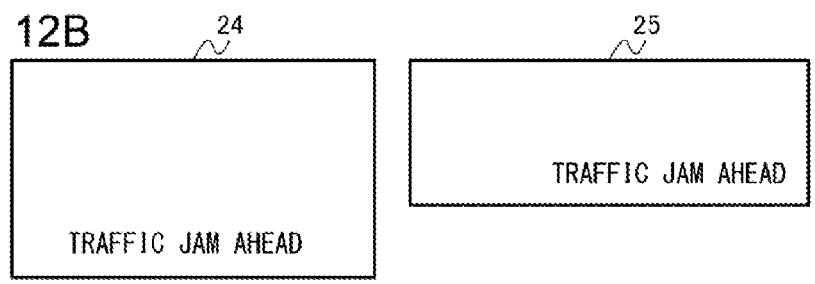
Figure 12C:
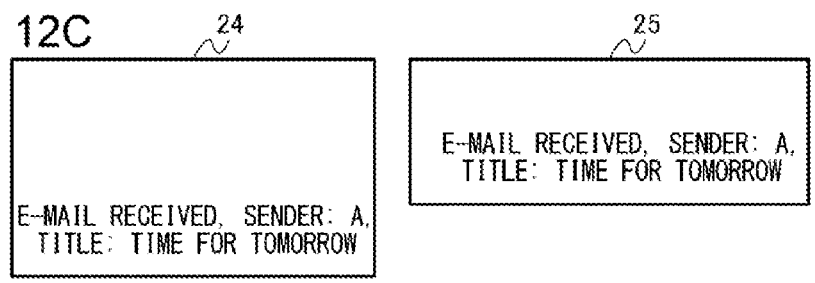
Figure 12D:
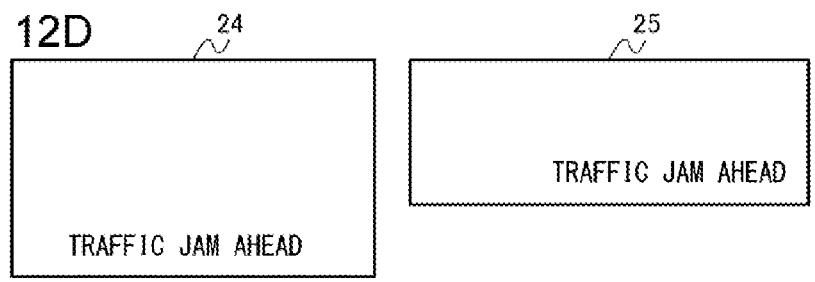
Figure 12E:
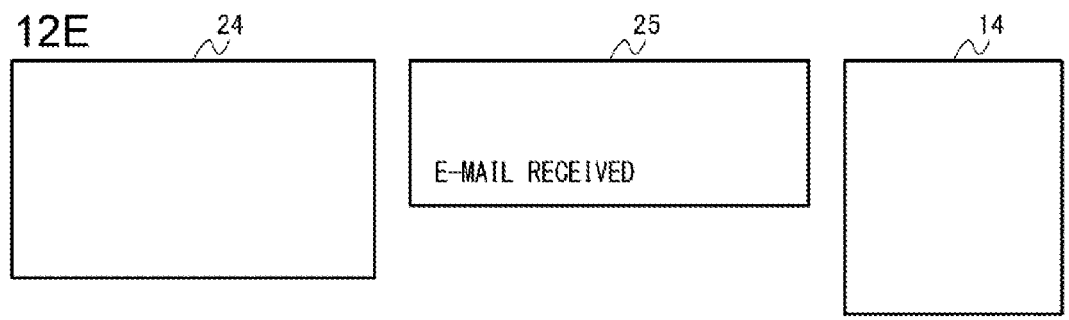

FIG. 12B corresponds to FIG. 5B and shows a display example of the case where the new notification information corresponds to the general information and where there are no passengers. FIG. 12C corresponds to FIG. 5C and shows a display example of the case where the new notification information corresponds to the driver's privacy information and where there are no passengers. FIG. 12D corresponds to FIG. 5D and shows a display example of the case where the new notification information corresponds to the general information and where a passenger is present. FIG. 12E shows a display example of the case where the new notification information corresponds to the driver's privacy information and where a passenger is present and where the mobile terminal 14 is linked.

As shown in FIG. 12E, when the display of the new notification information is restricted and when the mobile terminal 14 is linked, the setter 42 displays the new notification information only on the meter display 25, which is a display specified in advance by the driver. In FIG. 12E, only the information of an email having been received is displayed on the meter display 25; however, as in FIG. 12C, information including the sender and the title may be displayed on the meter display 25.

With the display processing device 32 of this modification, the driver's privacy information is displayed on a display specified by the driver, so that, while presenting information, the driver's privacy can be protected more easily. The display specified by the driver may be a display fixedly installed in the vehicle 12 (such as the meter display 25 and the HUD 26) or may be a portable display such as the mobile terminal 14. When a display fixedly installed in the vehicle 12 is specified, the movement of the driver's line of sight for checking information is reduced, and the safety can be improved.

The present disclosure has been described based on the first through third embodiments. The embodiments are intended to be illustrative only, and it will be obvious to those skilled in the art that various modifications to a combination of constituting elements or processes in the embodiments could be developed and that such modifications also fall within the scope of the present disclosure.

The functions of the display processing device 32 according to each of the aforementioned embodiments may be implemented by multiple devices. That is, the processing performed by the display processing device 32 according to each embodiment may be implemented by a system in which multiple devices communicate and cooperate with each other.

Optional combinations of the aforementioned embodiments and modifications may also be practiced as additional embodiments of the present disclosure. Such an additional embodiment made by combination has the effect of each of the combined embodiments and modifications. It will be obvious to those skilled in the art that the function to be achieved by each constituent feature described in the claims may be implemented by each of the constituting elements described in the embodiments or modifications, or by the cooperation of those constituting elements. Further, when the terms "first", "second", and the like are used in the present specification or claims, such terms do not imply any order or degree of importance and are used to distinguish one configuration from another, unless otherwise specified.

Appendix

From the description of the aforementioned embodiments and modifications, the following technologies are disclosed.

Technology 1

A display processing device, including:
an acquirer that acquires notification information;
a setter that sets, for each of multiple display screens provided in a vehicle, notification information to be displayed on the display screen, based on a priority level related to the notification information; and
a changer that changes, when notification information on one display screen among the multiple display screens is changed based on an operation by a driver of the vehicle performed on a display screen set by the setter, notification information to be displayed on another display screen, based on the change of the notification information on the one display screen, wherein
when notification information displayed on one display screen among the multiple display screens is to be changed to another notification information based on an operation by the driver and when an occupant other than the driver is present in the vehicle and when the another notification information is information associated with the driver, the setter restricts the display of the another notification information on the one display screen.

With this display processing device, information associated with the driver can be prevented from being seen by a passenger, and the driver's privacy can be protected.

Technology 2

The display processing device according to Technology 1, wherein the information associated with the driver is privacy information of the driver.

With this display processing device, the driver's privacy information can be prevented from being seen by a passenger, and the driver's privacy can be protected.

Technology 3

The display processing device according to Technology 1 or 2, wherein, when the display of the another notification information on the one display screen is restricted and when next notification information to be displayed next to the another notification information has been acquired, the setter sets the next notification information as notification information to be displayed on the one display screen.

With this display processing device, while protecting the driver's privacy, notification information that is not problematic in terms of protection of the driver's privacy can be presented to an occupant.

Technology 4

The display processing device according to Technology 1 or 2, wherein, when an occupant other than the driver in the vehicle is a person who is permitted to view information associated with the driver, even if the another notification information is information associated with the driver, the setter sets the another notification information as notification information to be displayed on the one display screen.

With this display processing device, when passengers are persons who are permitted to view information associated with the driver, notification information can be presented to all the occupants.

Technology 5

The display processing device according to Technology 1 or 2, wherein, when the display of the another notification information on the one display screen is restricted and when communication with a predetermined mobile terminal has been established, the setter sets the another notification information as notification information to be displayed on the predetermined mobile terminal.

With this display processing device, while protecting the driver's privacy, the driver's privacy information can be sent to the driver himself or herself.

Technology 6

The display processing device according to Technology 1 or 2, wherein, when the display of the another notification information on the one display screen is restricted, the setter sets the another notification information as notification information to be displayed on a display screen specified in advance by the driver.

With this display processing device, information associated with the driver is displayed on a display screen specified by the driver, so that, while presenting information, the driver's privacy can be protected more easily.

Technology 7

A display processing system, including:
an acquirer that acquires notification information;
a setter that sets, for each of multiple display screens provided in a vehicle, notification information to be displayed on the display screen, based on a priority level related to the notification information; and
a changer that changes, when notification information on one display screen among the multiple display screens is changed based on an operation by a driver of the vehicle performed on a display screen set by the setter, notification information to be displayed on another display screen, based on the change of the notification information on the one display screen, wherein
when notification information displayed on one display screen among the multiple display screens is to be changed to another notification information based on an operation by the driver and when an occupant other than the driver is present in the vehicle and when the another notification information is information associated with the driver, the setter restricts the display of the another notification information on the one display screen.

With this display processing system, information associated with the driver can be prevented from being seen by a passenger, and the driver's privacy can be protected.

Technology 8

A display processing method in which a computer implements:
acquiring notification information;
setting, for each of multiple display screens provided in a vehicle, notification information to be displayed on the display screen, based on a priority level related to the notification information;
changing, when notification information on one display screen among the multiple display screens is changed based on an operation by a driver of the vehicle performed on a set display screen, notification information to be displayed on another display screen, based on the change of the notification information on the one display screen; and
restricting, when notification information displayed on one display screen among the multiple display screens is to be changed to another notification information based on an operation by the driver and when an occupant other than the driver is present in the vehicle and when the another notification information is information associated with the driver, the display of the another notification information on the one display screen.

With this display processing method, information associated with the driver can be prevented from being seen by a passenger, and the driver's privacy can be protected.

While various embodiments have been described herein above, it is to be appreciated that various changes in form and detail may be made without departing from the spirit and scope of the invention(s) presently or hereafter claimed.

CROSS-REFERENCE TO RELATED APPLICATION

This application is based upon and claims the benefit of priority from the prior Japanese Patent Application No.

2023-011859, filed on Jan. 30, 2023, the entire contents of which are incorporated herein by reference.

What is claimed is:

1. A display processing device, comprising:
a processor; and
a memory including a program that, when executed by the processor, causes the processor to perform functions, the functions including:
acquiring first notification information;
setting, for each display screen of a plurality of display screens provided in a vehicle, information to be displayed on the display screen, based on a priority level related to the first notification information; and
setting, when the first notification information displayed on a first display screen among the plurality of display screens is changed based on a first operation by a driver of the vehicle performed on one of the plurality of display screens, second notification information to be displayed on a second display screen among the plurality of display screens, based on the change of the first notification information displayed on the first display screen, wherein
when the first notification information displayed on the first display screen among the plurality of display screens is to be changed to third notification information based on a second operation by the driver and when an occupant other than the driver is present in the vehicle and when the third notification information is associated with the driver, the processor restricts the display of the third notification information on the first display screen, and
when the display of the third notification information on the first display screen is restricted and when fourth notification information to be displayed with the third notification information has been acquired, the processor sets the fourth notification information to be displayed on the first display screen.

2. The display processing device according to claim 1, wherein the third notification information associated with the driver is privacy information of the driver.

3. The display processing device according to claim 1, wherein, when the occupant other than the driver in the vehicle is permitted to view the third notification information associated with the driver, even if the third notification information is associated with the driver, the processor sets the third notification information to be displayed on the first display screen.

4. The display processing device according to claim 1, wherein, when the display of the third notification information on the first display screen is restricted and when communication with a predetermined mobile terminal has been established, the processor sets the third notification information to be displayed on the predetermined mobile terminal.

5. The display processing device according to claim 1, wherein, when the display of the third notification information on the first display screen is restricted, the processor sets the third notification information to be displayed on a specific display screen specified in advance by the driver.

6. A display processing system, comprising:
at least one processor; and
at least one memory including a program that, when executed by the processor, causes the processor to perform functions, the functions including:
acquiring first notification information;
setting, for each display screen of a plurality of display screens provided in a vehicle, information to be displayed on the display screen, based on a priority level related to the first notification information; and
setting, when the first notification information displayed on a first display screen among the plurality of display screens is changed based on a first operation by a driver of the vehicle performed on one of the plurality of display screens, second notification information to be displayed on a second display screen among the plurality of display screens, based on the change of the first notification information displayed on the first display screen, wherein
when the first notification information displayed on the first display screen among the plurality of display screens is to be changed to third notification information based on a second operation by the driver and when an occupant other than the driver is present in the vehicle and when the third notification information is associated with the driver, the processor restricts the display of the third notification information on the first display screen, and
when the display of the third notification information on the first display screen is restricted and when fourth notification information to be displayed next to the third notification information has been acquired, the processor sets the fourth notification information to be displayed on the first display screen.

7. A display processing method implemented by a computer, the display processing method comprising:
acquiring first notification information;
setting, for each display screen of a plurality of display screens provided in a vehicle, information to be displayed on the display screen, based on a priority level related to the first notification information;
setting, when the first notification information displayed on a first display screen among the plurality of display screens is changed based on a first operation by a driver of the vehicle performed on one of the plurality of screens, second notification information to be displayed on another a second display screen among the plurality of display screens, based on the change of the first notification information displayed on the first display screen;
restricting, when the first notification information displayed on one the first display screen among the plurality of display screens is to be changed to third notification information based on a second operation by the driver and when an occupant other than the driver is present in the vehicle and when the third notification information is associated with the driver, the display of the third notification information on the first display screen; and
when the display of the third notification information on the first display screen is restricted and when fourth notification information to be displayed with the third notification information has been acquired, setting the fourth notification information to be displayed on the first display screen.

* * * * *